Figure 1:
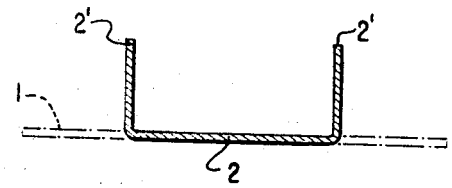

Sept. 24, 1968     A. H. MÜLLER     3,402,586

METHOD OF MACHINING METAL PARTS

Filed Dec. 18, 1964

INVENTOR.
ALFRED H. MUELLER

Dicke & Craig

United States Patent Office 3,402,586
Patented Sept. 24, 1968

3,402,586
METHOD OF MACHINING METAL PARTS
Alfred H. Müller, Waiblingen, Germany, assignor to Daimler-Benz Aktiengesellschaft, Stuttgart-Unterturkheim, Germany
Filed Dec. 18, 1964, Ser. No. 419,515
Claims priority, application Germany, Dec. 18, 1963, D 43,195
7 Claims. (Cl. 72—225)

The present invention relates to a method for fixing or making fast sheet metal parts, punched out of flat sheet-bar or plate-bar stock, preferably for those which are bent or drawn subsequently out of the plane thereof into any desired body, for example, into bent-up or turned-up bearers of angularly shaped cross section or of open hollow cross section, for instance, at longitudinal bearers for motor vehicles having in particular U-shaped cross section.

The present invention aims at making fast the cutting edges of the blanks and more particularly at making the end surfaces of the cutting edges resistant to tearing and cracking during any subsequent stressing and machining thereof, and more specifically with a view to increase the durability and life of the bearers especially with respect to the strong torsional stresses above all at the inner edges of the leg portions of the U-shaped cross section.

The present invention essentially consists in that one rolls, especially parabolically, the cutting edges by means of rollers. The sharp edges originating by the stamping or punching-out operation are thereby rounded off and the hairline cracks occurring during the shearing off of the sheet metal stock are rounded off while additionally the occurrence of fine hairline cracks during the further machining or stressing of the sheet metal is effectively prevented. Additionally, with a bearer construction for a vehicle, no tears or fissures are produced at the sharp edges resulting from the punching-out operation during torsional loads of the frame.

Accordingly, it is an object of the present invention to provide a method for preparing metal pieces punched out from stock material to permit secure fixing thereof which avoids, by simple means, the aforementioned drawbacks encountered with the prior art.

It is another object of the present invention to provide a method and apparatus for finishing the edges of punched-out sheet metal parts which prevents the occurrence of hairline cracks during further machining or during future stressing of the parts.

A further object of the present invention resides in the provision of a method for shaping the cutting edges of a punched-out plate or sheet bar pieces which obviates the disadvantages caused by the sharp edges produced during the punching or stamping operation.

Figure 2:
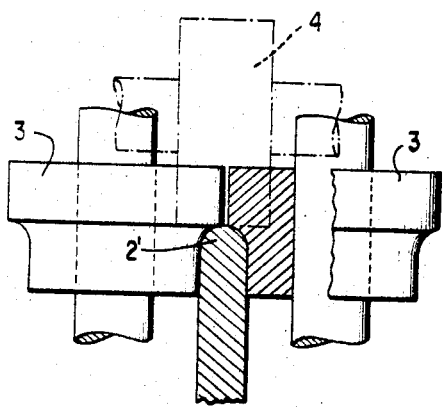

These and other objects, features, and advantages of the present invention will become more obvious from the following description when taken in connection with the accompanying drawing, which shows, for purposes of illustration only, one embodiment in accordance with the present invention, and wherein:

FIGURE 1 is a cross sectional view through the completed bearer member finished in accordance with the present invention and, FIGURE 2 is a partial schematic elevational view of an apparatus used for carrying out the method of the present invention, FIGURE 2 being on an enlarged scale compared with FIGURE 1 and having parts thereof shown in cross section for sake of clarity.

In the embodiment of FIGURE 1, the sheet metal strip punched or stamped out of a flat sheet metal bar or plate stock was bent or turned up into a U-shaped cross section 2. The purpose of the present invention is to eliminate the sharp edges 2' of the U-shaped leg portions produced during the punching out operation. For this purpose, the sharp edges 2' are rounded off parabolically by the shaping or forming rollers 3, 3 (FIGURE 2). If one also desires to eliminate the rolling seam or burr conditioned by the intermediate space between the shaping rollers 3, one may according to the present invention roll flat the seam or burr by a further horizontally arranged roller 4, as indicated in FIGURE 2 in dash and dot lines.

Two possibilities exist for the feed of the punched-out sheet metal part. Either the rollers 3, 3 are driven externally by conventional means and frictionally pull the strip, that is in FIGURE 1 the leg portions of the bearer through the space formed between respective oppositely disposed rollers 3 of each pair or one feeds or pushes by conventional means the sheet metal strip through the rollers which in that case are freely rotatably supported on the supporting pins or shafts thereof. In both cases it is appropriate to place the rail profile or cross section with its web also on a conventional sliding or rolling support.

Additionally, both ends 2' of the U-shaped leg portions may be simultaneously machined by providing an appropriate installation having two pairs of rollers 3 and two rollers 4. In that case, suitable conventional means may be provided for changing the distance between the two pairs of rollers so as to accommodate U-shaped members having web sections of different dimension. A conventional screw feed or the like may be used for that purpose. Additionally, the distance between two rollers of a respective pair may be changed with respect to the workpiece, for example, by means of conventional displaceable or pivotal roller bearings in order to be able to utilize the same rollers for differing sheet metal wall thicknesses. Again feed screw or worm type adjusting means may be provided for that purpose. Similarly, the height of the rollers 3 and/or of the roller 4 may be adjustable by analogous conventional means to accommodate leg portions of different height.

While FIGURE 1 illustrates a U-shaped sheet metal bearer part having two leg portions, it is understood that the present invention may be used in other ways. For example, the arrangement of FIGURE 2 and the method in accordance with the present invention is equally applicable to remove the sharp edges of a flat sheet metal bar or plate strip punched out of a plane sheet metal plate. All that is necessary is to place and feed such sheet metal strip in the proper position thereof with the sharp edge thereof produced by the punching-out operation engaging the rollers 3 and eventually roller 4. With a vertical roller installation as shown in FIGURE 2, it is appropriate to place the sheet metal strip upright on conventional suitable sliding or rolling support means, providing also appropriate guide means for the strip. Again, the distance between the rollers 3 and the height thereof as well as of the roller 4 may be adjustable by suitable conventional means. The height adjustment of roller 4 is necessary to take into consideration the differing width of the strips since the seams or burrs change with the thickness of the material.

While I have shown and described one embodiment in accordance with the present invention, it is understood that the same is not limited thereto but is susceptible of numerous changes and modifications. For example, instead of a vertical roller arrangement, the present invention is applicable also to a horizontal arrangement of the roller axes 3 or at any suitable angle. Furthermore, the present invention is not limited in its applictation to U-shaped bearers as shown in FIGURE 1 or to a flat sheet metal strip, as mentioned above, but is equally applicable to the edge-machining of angularly shaped, U-shaped, or Z-shaped profiles or hollow profiles, of, for example, semi-circular shape or oval shape. The machining operation of the cutting edges according to the present invention may be undertaken either prior to or after the establishment of the final form of the particular metal part.

Thus, it is obvious that the present invention is not limited to the details shown and described herein but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A method of manufacturing a metal part comprising the steps of:
   cutting flat sheet metal to form a sheet metal part having opposite parallel side faces terminating at one common end in parallel cut edges, and further having an end face between the cut edges that is generally perpendicular to the side faces;
   simultaneously rolling each cut edge inwardly along a line generally bisecting the angle between the respective side face and end face, forming a rounded end face.

2. The method according to claim 1, wherein said step of simultaneously rolling, parabolically rolls each cut edge.

3. The method according to claim 1, including the step of rolling said rounded end face, subsequent to said step of simultaneously rolling, inwardly along a line generally parallel to the side faces.

4. The method according to claim 1, including the step of bending the sheet metal part into a U-cross sectional shape having the one common end at the outer extremity of one leg and substantially parallel to the two bend lines forming the U-shaped and another common end at the outer extremity of the other leg substantially identical to the one common end; rolling the other common end substantially identically to the rolling of the one common end.

5. An installation for rounding off the cutting edges of punched-out sheet metal parts, comprising pairs of spaced shaping roller means providing a space therebetween through which is fed the sheet metal part, the roller means of each of said pairs comprising rollers of differing diameters joined by a portion of parabolic contour, the larger diameter rollers of said rollers of differing diameters defining the limits of a gap,
   and further roller means disposed at an approximately right angle to the axis of the first-mentioned roller means for rolling the material displaced into said gap.

6. An installation for rounding off the cutting edges of punched-out sheet metal parts, according to claim 5, wherein said gap is of varying width.

7. An installation for rounding off the cutting edges of punched out sheet metal parts, according to claim 6, wherein the lesser-diametered rollers of said roller means are spaced from each other and thereby define the lateral limits of said space.

References Cited

UNITED STATES PATENTS

| | | | |
|---|---|---|---|
| 311,250 | 1/1885 | Koehler | 72—224 |
| 999,467 | 8/1911 | Sack | 72—177 |
| 1,343,753 | 6/1920 | Sloper | 72—177 |
| 2,184,150 | 12/1939 | Parker et al. | 72—224 |

OTHER REFERENCES

"Grundlagen des Walzens," Von Cotel, 1953, p. 93, Fig. 74, Halle, E. Germany; W. Knapp, Publishers.

CHARLES W. LANHAM, *Primary Examiner.*

E. M. COMBS, *Assistant Examiner.*